United States Patent
Lee

(10) Patent No.: US 7,062,292 B2
(45) Date of Patent: Jun. 13, 2006

(54) COMPUTER SYSTEM WITH WIRELESS AUDIO SIGNAL RECEIVING MODULE

(75) Inventor: Rong-Jung Lee, Tainan (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 373 days.

(21) Appl. No.: 10/458,687

(22) Filed: Jun. 11, 2003

(65) Prior Publication Data

US 2004/0147283 A1    Jul. 29, 2004

(30) Foreign Application Priority Data

Jan. 29, 2003   (TW) .............................. 92201717 U

(51) Int. Cl.
   *H04B 1/38* (2006.01)
(52) U.S. Cl. ..................... 455/557; 455/133; 455/556.1
(58) Field of Classification Search ................ 455/557, 455/88, 352, 132, 133, 140, 277, 552.1, 556.1; 379/100.15, 93.09, 93.28
See application file for complete search history.

(56) References Cited

U.S. PATENT DOCUMENTS

| | | | | |
|---|---|---|---|---|
| 5,241,696 A | * | 8/1993 | Mori et al. ............... | 455/186.2 |
| 5,371,901 A | * | 12/1994 | Reed et al. .................... | 455/69 |
| 5,711,012 A | * | 1/1998 | Bottoms et al. ............ | 455/557 |
| 5,930,729 A | * | 7/1999 | Khamis et al. ............. | 455/571 |
| 2001/0055351 A1 | * | 12/2001 | Malkemes et al. .......... | 375/347 |
| 2002/0082046 A1 | * | 6/2002 | Peters et al. ................ | 455/556 |
| 2002/0137505 A1 | * | 9/2002 | Eiche et al. ................ | 455/425 |

\* cited by examiner

*Primary Examiner*—Nguyen T. Vo
*Assistant Examiner*—Nhan T. Le
(74) *Attorney, Agent, or Firm*—Rosenberg, Klein & Lee

(57) ABSTRACT

A computer system includes a wireless audio signal receiver module for receiving a wireless signal from a wireless transmitter separated from the computer system. The wireless audio signal receiving module includes a mode selector that is switchable between an audio mode and an instruction mode. When the mode selector is set to the audio mode, the wireless signal received by the receiver module is transmitted to a sound effect interface of the host device as audio signal and when the mode selector is set to the instruction mode, the wireless signal received by the receiver module is transmitted to a bus of the host device as instruction signal.

7 Claims, 3 Drawing Sheets

COMPUTER SYSTEM WITH WIRELESS AUDIO SIGNAL RECEIVING MODULE

BACKGROUND OF THE INVENTION

1. Field of the Invention

The present invention relates generally to audio signal receiving and transmission of a computer system, and in particular to a computer system capable of receiving and transmitting audio signals between a host computer and an individual transmitter in a wireless manner.

2. Description of the Prior Art

Computers are widely used in a variety of applications, such as industry, business, office, education and household applications. A multi-media computer system comprises a host computer to which audio/video processing means is coupled for handling audio and video signals. The audio and video signals processed in the host computer are broadcast and displayed by means of speakers and image displays, while the computer receives voice signals by means of a microphone or the likes. Conventionally, the microphone is connected to the host computer by means of a cable. An example is illustrated in Taiwan Utility Model Publication No. 268631 in which a voice input device for a notebook computer is disclosed. An elongate slot is defined in a casing of the notebook computer for accommodating a connector that is connected by wires to the computer. A voice receiver comprises a microphone supported by a bar mounted to the slot and electrically connected to the connector for receiving voice and converting the voice into electrical signals transmitted to the computer. Another example is illustrated in Taiwan Utility Model Publication No. 279522 in which a computer keyboard is disclosed, comprising a flexible bar mounted thereto and having a free end to which a microphone is attached.

There are other examples known in the art, such as Taiwan Utility Model Publication No. 438003, which discloses a peripheral device integrating a radio, a microphone and a computer mouse. The microphone is connected by wires to a voice processing unit for retrieving voice signal that is then converted into electrical signals transmitted to the computer by a USB (Universal Series Bus) control interface. Taiwan Utility Model Publication No. 247950 discloses a combination of computer mouse and microphone. The computer mouse has a casing in which the microphone is mounted whereby while the computer mouse controls the movement of a cursor on a computer display, the microphone receives and transmits voice to the computer.

Conventionally, the microphone is connected to a host computer by wires as evidenced by the known references cited above. The wires that connect the microphone to the computer inevitably limit the operability and movability of the microphone, no matter the microphone is individually connected to the host computer or the microphone is integrated with a peripheral device that is connected to the computer by wires. Such a deficiency can be overcome by coupling a microphone to a host computer in a wireless manner and the present invention is aimed to provide a computer system capable of receiving voice or audio signals in wireless manner.

SUMMARY OF THE INVENTION

An object of the present invention is to provide a computer system comprising a wireless audio signal receiver for receiving audio signal transmitted from a remote wireless signal transmitter in a wireless manner.

Another object of the present invention is to provide a computer system comprising a wireless signal receiver module that receives both audio signal and instruction signal whereby the computer system is capable of control by voice instruction.

To achieve the above objects, in accordance with the present invention, there is provided a computer system comprising a wireless audio signal receiver module for receiving a wireless signal from a wireless audio signal transmitter. The receiver module comprises a mode selector switchable between an audio mode wherein the wireless signal received is handled as an audio signal transmitted to a sound effect interface of the computer system and an instruction mode wherein the wireless signal received is handled as an instruction signal and transmitted to a bus of the computer system. The wireless audio signal receiver module comprises an antenna, a wireless signal receiver circuit, a filtering and pre-amplification circuit, a signal demodulation circuit, an instruction signal amplifier, and an audio signal amplifier. The wireless audio signal receiver module further comprises a tuner and a decoding unit. The wireless audio signal transmitter comprises a microphone, a filtering and pre-amplification circuit, a signal modulation circuit, an amplifier, a signal transmitting circuit and an antenna. The wireless audio signal transmitter further comprises a tuning device and an encoding unit.

The computer system in accordance with the present invention comprise a wireless audio signal receiver module coupled to a host device of the computer system for receiving, in a wireless manner, a wireless signal transmitted from a wireless audio signal transmitter to which a microphone is connected. Thus, the deficiency of limited movability of the microphone encountered in the prior art is eliminated. Voice input through the microphone can be stored in data storage of the host device of the computer system. In addition, the present invention provides a computer system that is capable of wireless receipt of voice signals and instruction signal whereby the present invention allows for switching between an audio mode in which voice signals are received and an instruction mode in which voice instructions are received.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENTS

Figure 1:
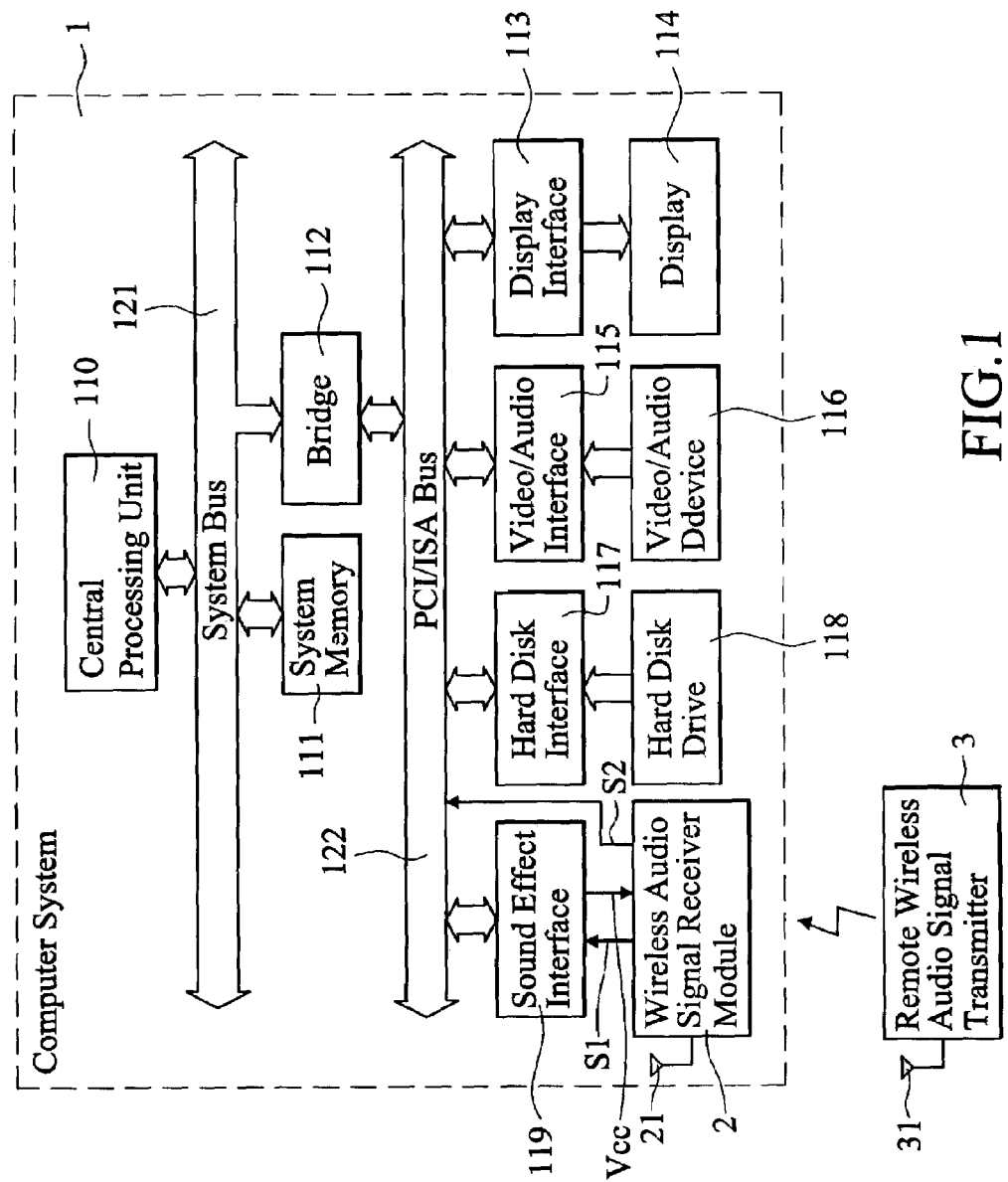
FIG. 1 is a system block diagram of a computer system in accordance with the present invention.

With reference to the drawings and in particular to FIG. 1, a computer system 1 comprises a central processing unit 110, a system memory 111, a bridge 112, a display interface 113, and a display 114. The central processing unit 110 and the system memory 111 are coupled to each other by a system bus 121 of the computer system 1. The system bus 121 is connected to a PCI/ISA bus 122 by the bridge 112 whereby the display 114 receives and displays video signals of the computer system 1 from the PCI/ISA bus 122 via the display interface 113. The computer system 1 may selectively incorporate multimedia devices, such as a video/audio device 116 that is coupled to the PCI/ISA bus 122 by a video/audio interface 115.

A hard disk drive 118 is also connected to the PCI/ISA bus 122 by a hard disk interface 117. A sound effect interface 119 is connected to the PCI/ISA bus 122 of the computer system 1. The sound effect interface 119 has an audio signal input port (not shown) for receiving and transmitting audio signals through the PCI/ISA bus 122 to the central processing unit 110 and the system memory 111 of the computer system 1. The audio signals may be stored in the hard disk drive 118 under the control of the computer system 1.

The computer system 1 comprises a wireless audio signal receiver module 2 that is coupled to the sound effect interface 119. The wireless audio signal receiver module 2 has an audio signal output port (not shown) connectable to the audio signal input port of the sound effect interface 119 for transmitting an audio signal S1 to the computer system 1 via the sound effect interface 119. The wireless audio signal receiver module 2 further comprises an instruction signal output port (not shown) for issuing an instruction signal S2 to the PCI/ISA bus 122 of the computer system 1.

The wireless audio signal receiver module 2 detects and receives a wireless signal transmitted from a remote wireless audio signal transmitter 3. When the wireless signal received by the wireless audio signal receiver module 2 comprises a regular audio signal, the signal received is forwarded, as audio signal S1, to the computer system 1 by the sound effect interface 119. When the wireless signal received by the wireless audio signal receiver module 2 comprises an instruction signal, the signal received is forwarded, as instruction signal S2, to the PCI/ISA bus 122 of the computer system 1.

Figure 2:
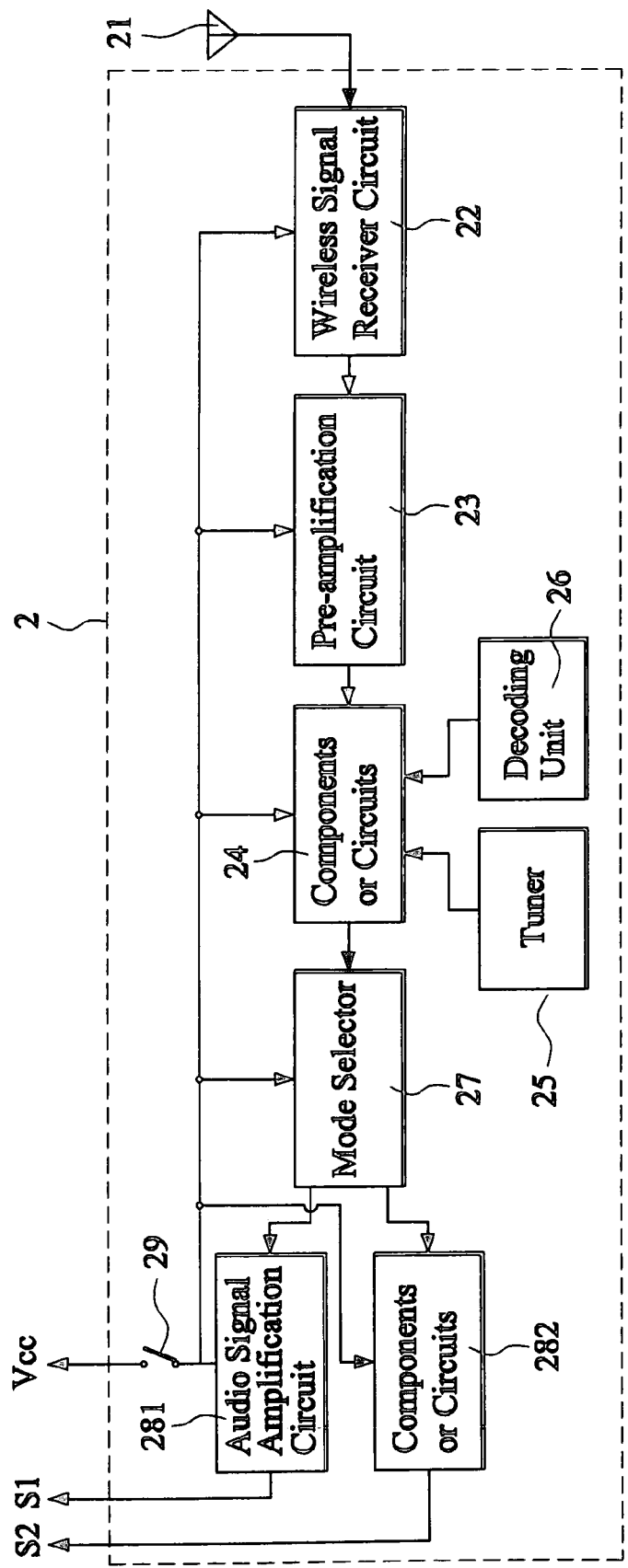
FIG. 2 is system block diagram of a wireless audio signal receiver module of the computer system in accordance with the present invention.

Also referring to FIG. 2, the wireless audio signal receiver module 2 comprises an antenna 21, a wireless signal receiver circuit 22, a filtering and pre-amplification circuit 23, a signal demodulation circuit 24, a tuner 25, a decoding unit 26, a mode selector 27, an audio signal amplification circuit 281 and an instruction signal amplification circuit 282.

The antenna 21, which is coupled to the wireless signal receiver circuit 22, receives the wireless signal from the wireless audio signal transmitter 3 and applies the received wireless signal to the wireless signal receiver circuit 22. The wireless signal is then forwarded through and processed by the filtering and pre-amplification circuit 23 for filtering noises out and pre-amplification of the signal. The signal demodulation circuit 24 then demodulates the pre-amplified signal.

The tuner 25 is coupled to the signal demodulation circuit 24, which may be embodied as a selection knob or a switching button to allow for manual tuning. Apparently, the tuner 25 may be devised to provide a fixed frequency or adjustable frequency for the signal demodulation circuit 24. The tuner 25 is set in correspondence with a tuning device (not shown) in the wireless audio signal transmitter 3 to coordinate signal transmission between the transmitter 3 and the receiver module 2.

The decoding unit 26 is also coupled to the signal demodulation circuit 24, which performs a decoding and/or deciphering operation corresponding to an encoding/enciphering operation performed in the wireless audio signal transmitter 3, also for realizing signal transmission between the transmitter 3 and the receiver module 2. The signal that transmits through the signal demodulation circuit 24 is thus decoded by the decoding unit 26. The decoded signal is forwarded to the mode selector 27, which is switchable between an audio mode and an instruction mode, respectively for passing an audio signal and an instruction signal to the audio signal amplification circuit 281 and the instruction signal amplification circuit 282 whereby path of the decoded signal is selected. For example, when the mode selector 27 is set to the audio mode, the decoded signal is transmitted to the audio signal amplification circuit 281 and the audio signal S1 corresponding to the decoded signal is generated and issued. When the mode selector 27 is set to the instruction mode, the decoded signal is transmitted to the instruction signal amplification circuit 282 and the instruction signal S2, corresponding to the decoded signal, is generated and issued.

A power source Vcc for the wireless audio signal receiver module 2 may be comprised of a power supply of the computer system 1 and is selectively connected to the components or circuits 22, 23, 24, 27, 281, 282 by a switch 29. Alternatively, the power source Vcc may be directly obtained from a power pin of the bus of the computer system 1.

Figure 3:
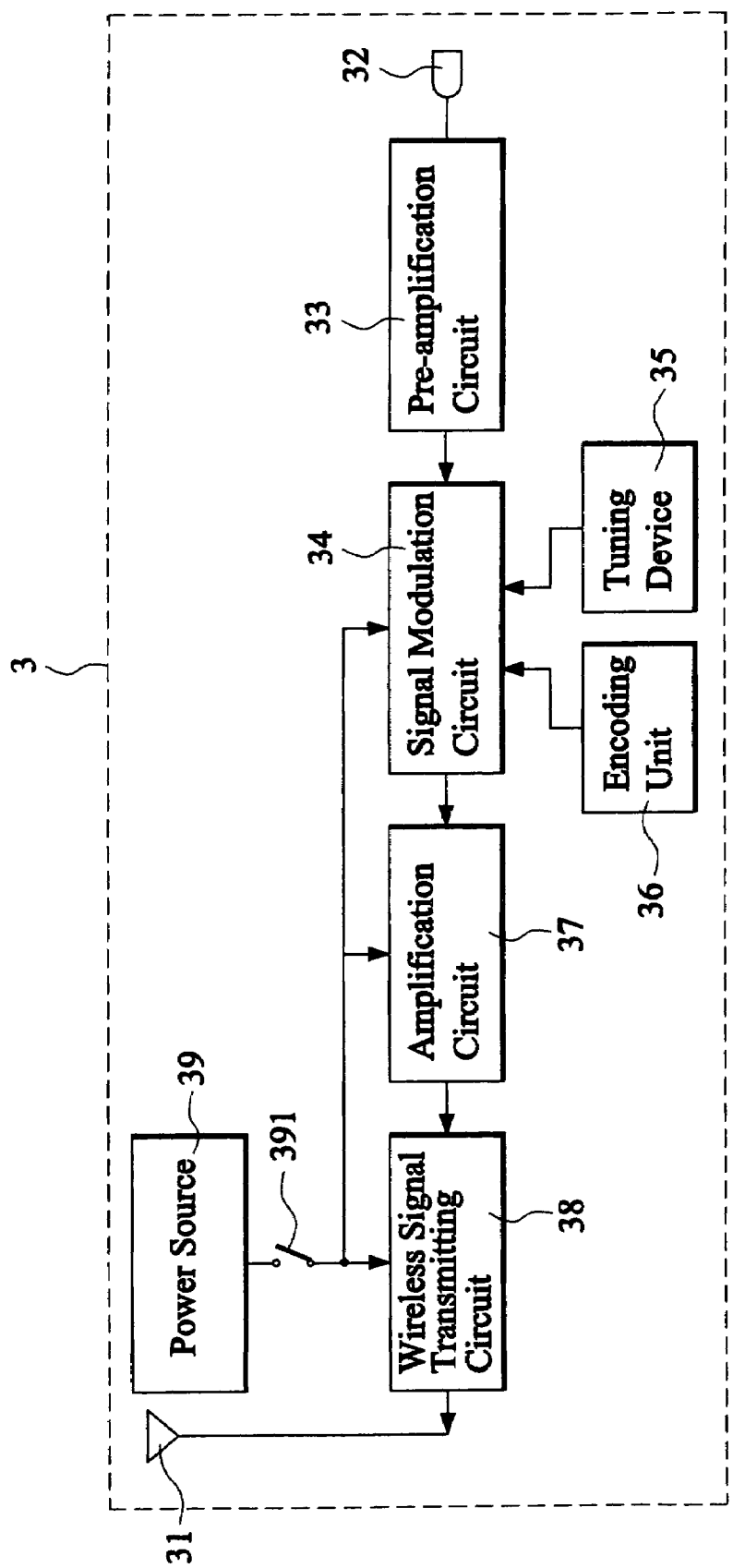
FIG. 3 is a block diagram of a wireless audio signal transmitter of the computer system in accordance with the present invention.

Also referring to FIG. 3, the wireless audio signal transmitter 3 comprises an antenna 31, a microphone 32, a filtering and pre-amplification circuit 33, a signal modulation circuit 34, a tuning device 35, an encoding unit 36, an amplifier circuit 37, and a wireless signal transmitting circuit 38. The microphone 32, which is coupled to the filtering and pre-amplification circuit 33, receives and converts a voice signal into an electrical signal that is transmitted through the filtering and pre-amplification circuit 33 for eliminating noises entraining the voice signal and for pre-amplification of the signal. The pre-amplified signal is applied to the signal modulation circuit 34 in which the signal is modulated.

The tuning device 35 is coupled to the signal modulation circuit 34 for manual tuning, which can be fixed or adjustable, in order to eliminating mutual-interference between the microphone and an adjacent microphone. The encoding unit 36 (or alternatively or additionally an enciphering unit) is coupled to the signal modulation circuit 34 for selectively encoding and/or enciphering the signal. Once the encoding/enciphering is performed in the transmitter 3, a decoding/deciphering operation must be performed in the wireless audio signal receiver module 2. The decoding/deciphering means may be incorporated in the decoding unit 26, or otherwise devised.

The signal modulation circuit 34 receives the pre-amplified signal from the filtering and pre-amplification circuit 33 and in turn generates a modulated signal forwarded to the amplification circuit 37 for amplification of the signal. The amplified signal is then applied to the wireless signal transmitting circuit 38 to have the signal converted into a RF signal, which is transmitted by the antenna 31 as the wireless signal to be received by the wireless audio signal receiver module 2. The antenna 31 has an effective transmission distance within which the wireless audio signal receiver module 2 is located. The effective transmission distance is for example 30 meters in a preferred embodiment of the present invention.

The wireless audio signal transmitter 3 comprises a power source 39, such as a battery, which supplies power, via a switch 391, to the components of the transmitter 3, such as the wireless signal transmitting circuit 38, the amplification circuit 37, and the signal modulation circuit 34. The switch 391 allows for manually shutting down the transmitter 3.

With the above described circuit arrangement in accordance with the present invention, when the wireless audio signal receiver module 2 receives the wireless signal transmitted from the wireless audio signal transmitter 3, the receiver module 2, based on the selection made with the mode selector 27, forwards the signal to the computer system 1 along different signal paths. For example, in the audio mode of the mode selector 27, in response to the wireless signal transmitted from the transmitter 3 and received by the receiver module 2, the receiver module 2 generates a corresponding audio signal S1 to the sound effect interface 119 of the computer system 1. The audio signal S1 may then be stored in the hard disk drive 118 by the sound effect interface 119 via the PCI/ISA bus 122. When the mode selector 27 is set to the instruction mode, the receiver module 2, in response to the received wireless signal from the transmitter 3, generates an instruction signal S2 to the PCI/ISA bus 122 of the computer system 1. The computer system 1, upon receiving the instruction signal S2, accesses audio database built in the hard disk drive 118 and performs a voice recognition process to compare and identify the instruction. An operation corresponding to the instruction is then performed in the computer system 1.

It is apparent that the present invention not only allow for input of audio signal in a wireless manner, but also providing an option for an operator to enter instruction to the computer system via the wireless connection between the transmitter and the receiver module.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A computer system with a wireless signal receiving module for receiving a wireless signal transmitted from a remote wireless signal transmitter, the wireless signal receiving module comprising:
    a sound effect interface connected to the computer system;
    a wireless audio signal receiver module coupled to the sound effect interface for receiving the wireless signal transmitted from the remote wireless signal transmitter; and
    a mode selector connected with the wireless audio signal receiver module and switchable between a first mode and a second mode, wherein when the mode selector is set to the first mode, the wireless signal received by the wireless audio signal receiver module is transmitted to the sound effect interface as an audio signal and when the mode selector is set to the second mode, the wireless signal received by the audio signal receiver module is transmitted to the computer system as an instruction signal;
    the wireless audio signal receiver module including:
    (a) a wireless signal receiver circuit to which an antenna is coupled for receiving the wireless signal transmitter from the wireless audio signal transmitter;
    (b) a filtering and pre-amplification circuit connected to the wireless signal receiver circuit for filtering and pre-amplifying the received wireless signal to provide an amplified signal;
    (c) a signal demodulation circuit connected to the filtering and pre-amplification circuit for demodulating the amplified signal and providing a demodulated signal to the mode selector;
    (d) a first amplifier coupled to the mode selector for receiving the demodulated signal when the mode selector is at the first mode and in response thereto providing the audio signal to the sound effect interface; and
    (e) a second amplifier coupled to the mode selector for receiving the demodulated signal when the mode selector is at the second mode and in response thereto providing the instruction signal to the bus.

2. The computer system as claimed claim in 1, wherein the wireless audio signal receiver module further comprises a tuner coupled to the signal demodulation circuit.

3. The computer system as claimed in claim 1, wherein the wireless audio signal receiver module further comprises a decoding unit coupled to the signal demodulation circuit.

4. The computer system as claimed in claim 1, wherein the wireless audio signal transmitter comprises:
    a microphone for receiving a voice and converting the voice into an electrical signal;
    a filtering and pre-amplification circuit connected to the microphone and filtering and pre-amplifying the electrical signal to provide a pre-amplified signal;
    a signal modulation circuit connected to the filtering and pre-amplification circuit for modulating the pre-amplified signal and providing a modulated signal;
    an amplifier coupled to the signal modulation circuit for amplifying the modulated signal and providing an amplified signal; and
    a wireless signal transmitting circuit coupled to the amplifier for receiving the amplified signal and generating the wireless signal that is emitted by an antenna coupled to the wireless signal transmitting circuit.

5. The computer system as claimed in claim 4, wherein the wireless audio signal transmitter further comprises a tuning device coupled to the signal modulation circuit.

6. The computer system as claimed in claim 4, wherein the wireless audio signal transmitter further comprises an encoding unit for encoding and enciphering the modulated signal.

7. The computer system as claimed in claim 4, wherein the wireless audio signal transmitter comprises a built-in power source comprised of a battery.

* * * * *